United States Patent
Upp et al.

(10) Patent No.: US 7,590,128 B2
(45) Date of Patent: Sep. 15, 2009

(54) METHOD AND SYSTEM FOR SETTING UP A MEDIA SESSION IN A TELECOMMUNICATIONS NETWORK

(75) Inventors: Karen M. Upp, Bartlett, IL (US); Trent J. Miller, Carol Stream, IL (US)

(73) Assignee: Motorola, Inc., Schaumburg, IL (US)

( * ) Notice: Subject to any disclaimer, the term of this patent is extended or adjusted under 35 U.S.C. 154(b) by 512 days.

(21) Appl. No.: 11/342,512

(22) Filed: Jan. 30, 2006

(65) Prior Publication Data

US 2007/0147398 A1 Jun. 28, 2007

Related U.S. Application Data

(60) Provisional application No. 60/754,449, filed on Dec. 28, 2005.

(51) Int. Cl.
*H04L 12/28* (2006.01)
*H04L 12/66* (2006.01)
*G06F 15/173* (2006.01)

(52) U.S. Cl. .................... 370/401; 370/352; 370/395.2; 370/409; 709/224

(58) Field of Classification Search ......... 370/241–352, 370/389–395, 401–467; 455/435–440; 709/217–224
See application file for complete search history.

(56) References Cited

U.S. PATENT DOCUMENTS

| | | | |
|---|---|---|---|
| 6,683,877 B1 * | 1/2004 | Gibbs et al. ............... | 370/395.2 |
| 6,819,673 B1 | 11/2004 | Giroir et al. | |
| 7,257,109 B2 * | 8/2007 | Sylvain ....................... | 370/352 |
| 7,328,042 B2 * | 2/2008 | Choksi ..................... | 455/552.1 |
| 7,424,025 B2 * | 9/2008 | Qian et al. .................. | 370/409 |
| 2003/0231623 A1 * | 12/2003 | Ryu et al. .................... | 370/352 |
| 2004/0010582 A1 * | 1/2004 | Oliver ........................ | 709/224 |
| 2004/0081159 A1 | 4/2004 | Pan et al. | |
| 2004/0218612 A1 * | 11/2004 | Zetterlund et al. .......... | 370/401 |
| 2005/0232238 A1 * | 10/2005 | Oran .......................... | 370/352 |
| 2006/0013194 A1 * | 1/2006 | Baumann et al. ............ | 370/352 |
| 2006/0034188 A1 * | 2/2006 | Oran et al. .................. | 370/254 |
| 2006/0233183 A1 * | 10/2006 | Soncodi ...................... | 370/401 |
| 2007/0002879 A1 * | 1/2007 | Lin ............................. | 370/401 |
| 2007/0116018 A1 * | 5/2007 | Doleh et al. ................. | 370/401 |

* cited by examiner

*Primary Examiner*—Man Phan

(57) ABSTRACT

A communication system sets a media session between a first media gateway and a second gateway through a media gateway controller. The first media gateway receives a control address of the second media gateway from the media gateway controller. The first media gateway allocates media processor resources from a pool of media processor resources at the first media gateway and communicates transport information associated with the allocated media processor resources to the second media gateway. The first media gateway also receives transport information associated with allocated media processor resources of the second media gateway. The media session is then set up between the first media gateway and the second media gateway, using the allocated media processor resources of the media gateway and the allocated media processor resources of the second media gateway.

19 Claims, 9 Drawing Sheets

_US 7,590,128 B2_

METHOD AND SYSTEM FOR SETTING UP A MEDIA SESSION IN A TELECOMMUNICATIONS NETWORK

FIELD OF THE INVENTION

The present invention relates, in general, to the field of telecommunications networks and specifically, to a method for setting up a media session in a telecommunications network.

BACKGROUND OF THE INVENTION

A media gateway facilitates the transmission of data or information from one wireless device to another wireless device. For this purpose, the media gateway initiates a media session between two or more wireless devices for the transmission of information. If one wireless device is in the coverage area of one media gateway and the second wireless device is located in the coverage area of another media gateway, then the media session is initiated between the two media gateways through a media gateway controller. This media gateway controller is responsible for setting up the media session between the media gateways.

There are several methods, known in the art, for setting up the media session between the media gateways. In one of the known methods, a media gateway controller requests two media gateways to set up a media session, and then initiates the media session by allocating media processor resources in the two media gateways.

However, the known methods for setting up the media session utilize a significant amount of operator network bandwidth between the two media gateways and the media gateway controller while allocating media processor resources. Further, in a typical media session set-up, the data or voice is transmitted from the first media gateway to the second media gateway through the media gateway controller. This uses a significant amount of operator networking bandwidth and at the same time increases cost of transmission.

Moreover, the methods known for the setting up of a media session do not offer the detection of an existing failure in the continuity of the media path. The media session cannot be set up if there is a fault in any of the media gateways involved in a media session or in the communication network or if the media path continuity fails. A fault in the media path continuity results in 'dead-air' transmission or failed media delivery. Some of the known methods for detecting fault in the media path continuity detect the fault only up to the network layer in the media gateway. Faults existing in any of the transport layer, session layer, presentation layer or application layer cannot be detected.

BRIEF DESCRIPTION OF THE DRAWINGS

The present invention is illustrated by way of example and not limitation in the accompanying figures, in which like references indicate similar elements, and in which.

Figure 1:
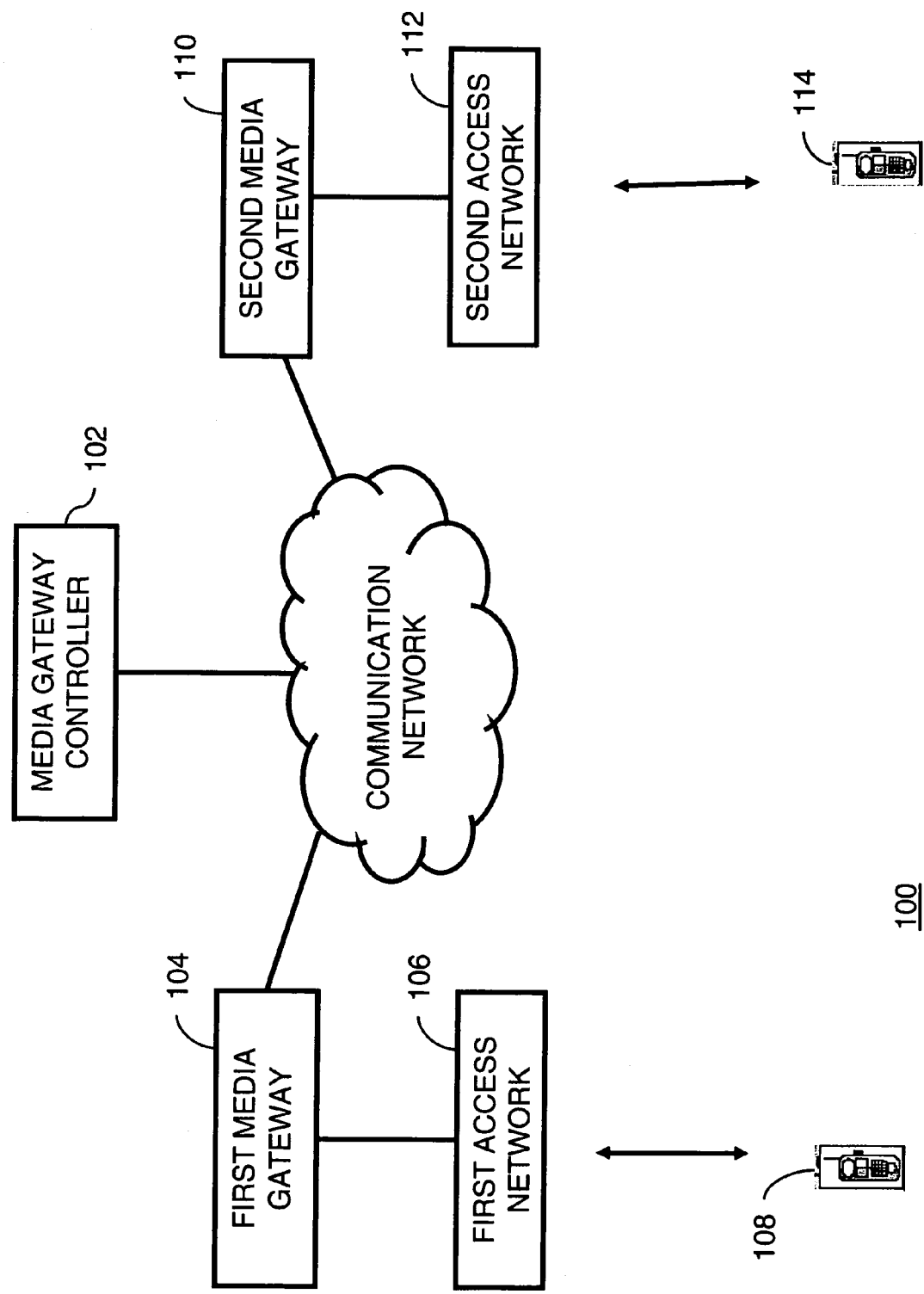
FIG. 1 is a block diagram of a communication network in which various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail the particular method and system for setting up a media session in a telecommunications network in accordance with the present invention, it should be observed that the present invention resides primarily in combinations of method steps and apparatus components related to method and system for setting up a media session. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In accordance with an embodiment of the present invention, a method for setting up a media session in a telecommunications network is provided. The telecommunications network includes a plurality of media gateways and a media gateway controller. A first media gateway receives a control address of a second media gateway from the media gateway controller. The first media gateway then allocates first media processor resources from a pool of media processor resources at the first media gateway. The first media gateway sends transport information associated with the first media processor resources to a second media gateway and receives transport information associated with second media processor resources of the second media gateway. The first media gateway uses the first media processor resources and the second media processor resources for setting up a media session for transmission of data between the first media gateway and the second media gateway.

FIG. 1 is a block diagram of a telecommunications system 100 in which various embodiments of the present invention can be practiced. The communication network 100 includes a media gateway controller 102 that is coupled to each of a first media gateway 104 and a second media gateway 110 via a network. Communication system 100 further includes a first access network 106, such as a base station or a radio access network, that is coupled to the first media gateway 104 and that provides wireless communication services to mobile devices, such as a first mobile device 108, residing in a coverage area of the first access network. Communication system 100 further includes a second access network 112, such as a base station or a radio access network, that is coupled to the second media gateway 110 and that provides wireless communication services to mobile devices, such as a second mobile device 114, residing in a coverage area of the second access network. Although only two media gateways, two access networks, and two mobile devices are shown in FIG. 1, it should be appreciated that the communication system 100 may comprise a plurality of media gateways, access networks, and mobile devices. Together, the media gateway controller 102, the first media gateway 104, the second media gateway 110, the first access network 106, and the second access network 112 may collectively be referred to herein as a telecommunications network. Examples of mobile devices, such as mobile devices 108 and 114, include wireless computational devices, wireless personal computers, mobile phones, wireless laptops, personal digital assistants (PDAs) and the like. A media session is set up between the first media gateway 104 and the second media gateway 110 through the media gateway controller 102 for transmitting data between the first media gateway 104 and the second media gateway 110.

Figure 2:
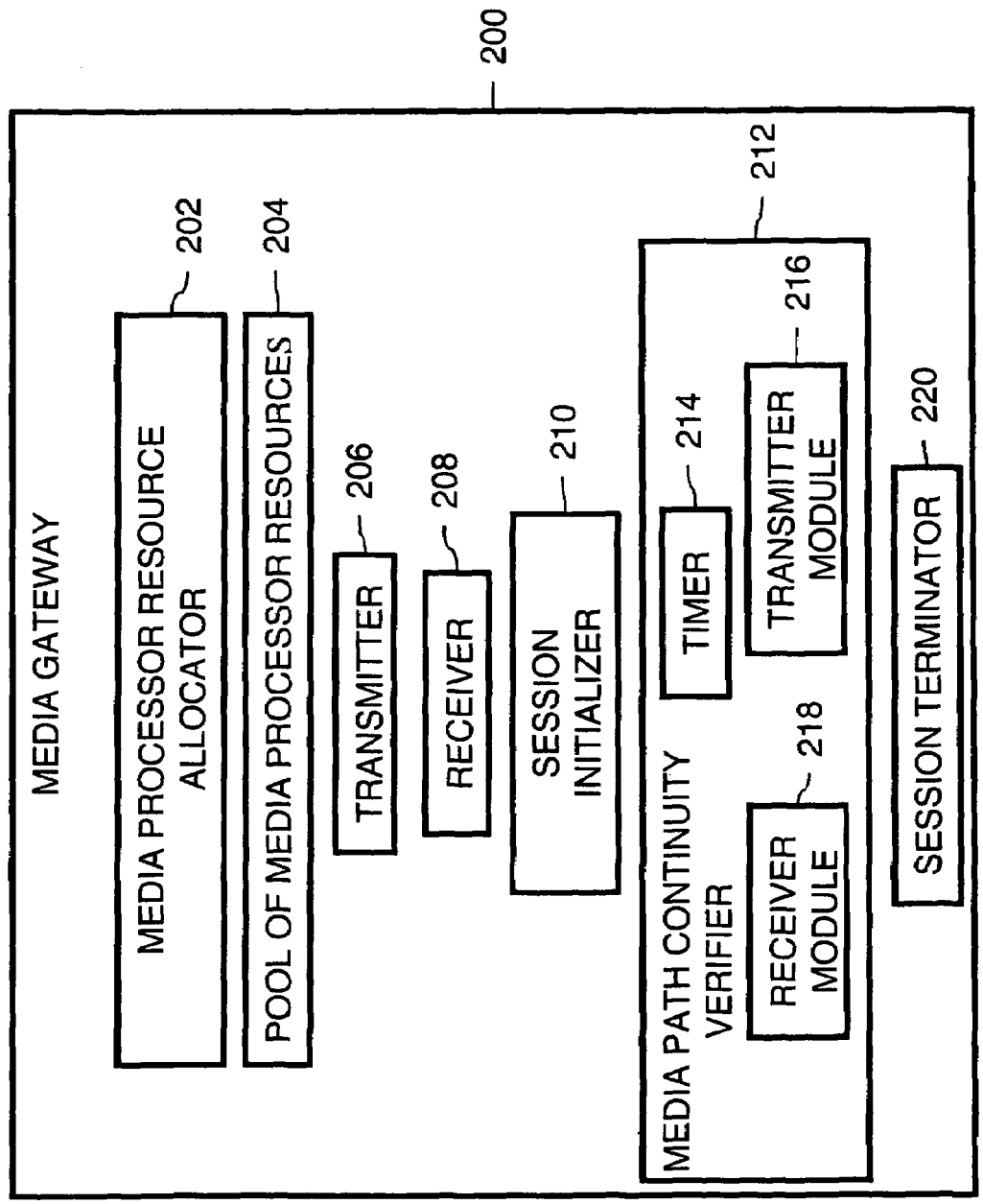
FIG. 2 is a block diagram of a media gateway of the communication system of FIG. 1 in accordance with various embodiments of the invention.

FIG. 2 is a block diagram of a media gateway 200, such as each of the first media gateway 104 and the second media gateway 110, of communication system 100 in accordance with various embodiments of the invention. The media gateway 200 includes a media processor resource allocator 202, a pool of media processor resources 204, a transmitter 206, a receiver 208, a session initializer 210, a media path continuity verifier 212, and a session terminator 220. The media path continuity verifier 212 comprises a timer 214, a transmitter module 216, and a receiver module 218. The media processor resource allocator 202 allocates media processor resources from the pool of media processor resources 204 at the media gateway 200. The pool of media processor resources 204 is used to set up a media session for the exchange of data and voice between the media gateway 200, for example, media gateway 104, and another media gateway, for example, media gateway 110. Each media processor resource of the pool of media processor resources 204 is allocated a unique routing address for identifying the media processor resource. The transmitter 206 transmits transport information associated with the allocated media processor resources to another media gateway. This transport information comprises the routing addresses associated with the allocated media processor resources and/or any other Layer 3 and Layer 4 routing information associated with the media gateway that may be useful in setting up the media session involving the media gateway 200. The receiver 208 receives transport information from another media gateway, which transport information comprises routing addresses associated with allocated media processor resources of the another media gateway and/or any other Layer 3 and Layer 4 routing information associated with another media gateway that may be useful in setting up the media session with the another media gateway. The session initializer 210 initiates a media session between the media gateway 200 and another media gateway. The media path continuity verifier 212 verifies a continuity of a media path between the media gateway 200 and another media gateway, that is, verifies that a bearer information media path between the media gateway 200 and another media gateway is operating normally, that is, at an acceptable error level.

The timer 214 of the media path continuity verifier 212 counts down a time period during which the media gateway 200 awaits a media path continuity check response from another media gateway. More particularly, the transmitter module 216 of the continuity verifier 212 may send a media path continuity check signal to another media gateway. When the signal is sent, media gateway starts the timer 214. In response to sending the signal, the receiver module 218 of the media gateway 200 may then receive a media path continuity check response from the other media gateway. The session terminator 220 may then terminate a media session between the media gateway 200 and the other media gateway if the media path continuity check response indicates a fault, such as an unacceptable error level and/or a discarding of a data packet, in the media path between the media gateway 200 and the other media gateway or if the timer 214 expires prior to the receipt of a media path continuity check response.

Figure 3:
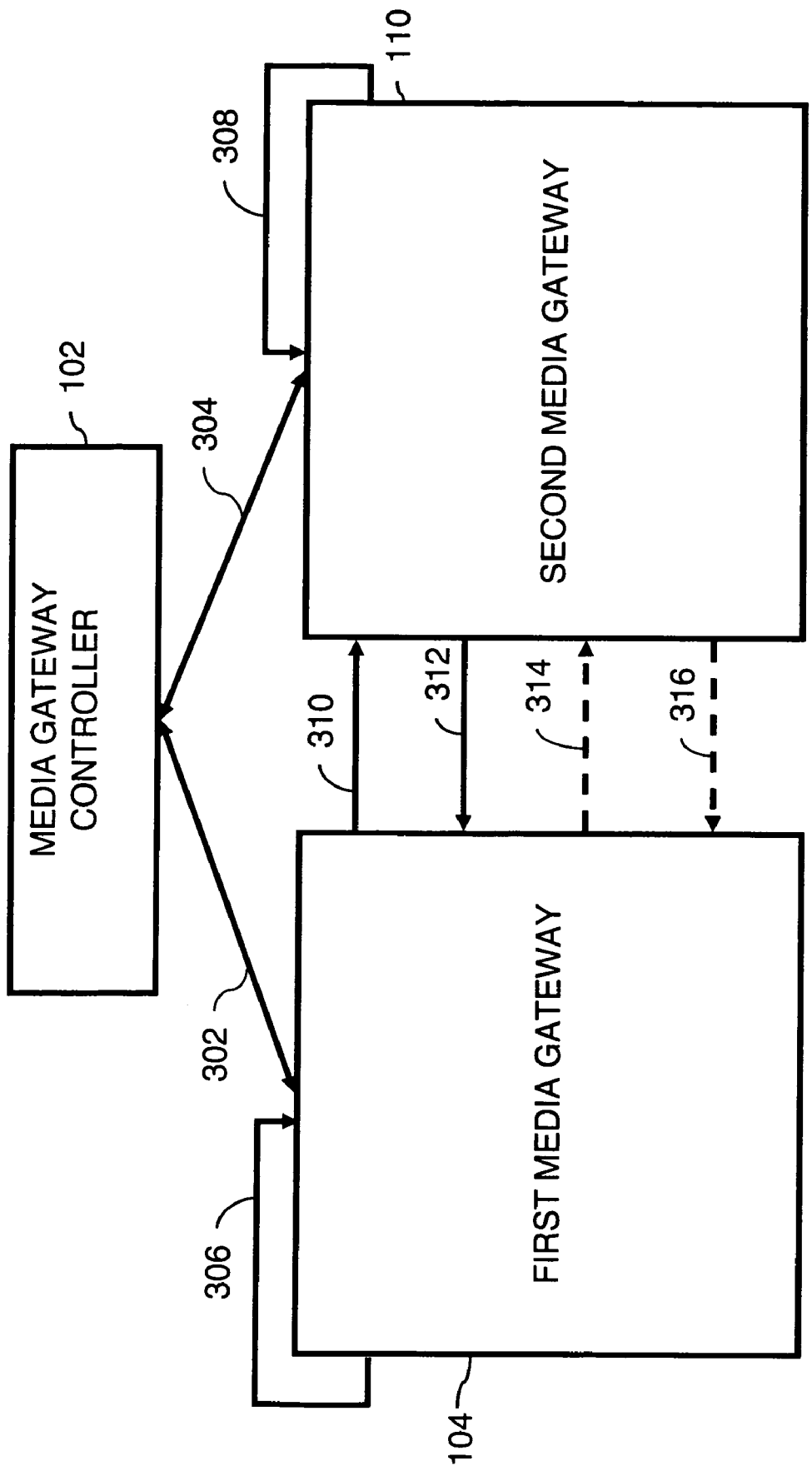
FIG. 3 is a block diagram illustrating signal flows associated with a setting up of a media session by the communication system of FIG. 1 in accordance with various embodiments of the present invention.

FIG. 3 is a block diagram of signal flows associated with a setting up of a media session between the first media gateway 104 and the second media gateway 110 through the media gateway controller 102 in accordance with various embodiments of the present invention. However, one of ordinary skill in the art realizes that either media gateway 104, 110 may function as a first media gateway or a second media gateway herein. When a media session needs to be set up, the media gateway controller 102 assigns the first media gateway 104 responsibility for controlling the process of setting up the media session. The first media gateway 104 receives a first media route set up message 302 from the media gateway controller 102. The first media route set up message 302 provides the first media gateway 104 with the necessary information to set up the media session by using the media processor resources of the first media gateway 104 and media processor resources of the second media gateway 110. The first media route set up message 302 informs the first media gateway 104 that the media session is to be initiated with the second media gateway 110 and further provides a routing address of the second media gateway. In an embodiment of the invention, the first media route set up message 302 may be received by a receiver 208 at the first media gateway 104.

The second media gateway 110 receives a second media route set up message 304 from the media gateway controller 102. The second media route set up message 304 informs the second media gateway 110 of the need for a media session between the first media gateway 104 and the second media gateway 110. The second media route set up message 304 provides the second media gateway 110 with the necessary information to set up the media session with the first media gateway 104, including a routing address of the first media gateway. At this point, both the first and second media gateways 104, 110 are informed that the media session is to be set up between the first media gateway and the second media gateway.

A media processor resource allocator 202 of the first media gateway 104 allocates first media processor resources from a pool of media processor resources 204 at the first media gateway. Through a first signal 306, the first media gateway 104 obtains the routing address of the first media processor resources of the first media gateway 104. A media processor resource allocator 202 of the second media gateway 110 allocates media processor resources from a pool of media processor resources 204 at the second media gateway 110. Through a second signal 308, the second media gateway 110 obtains the routing address of the second media processor resources of the second media gateway 110. The first media gateway 104 sends, via a transmitter 206 of the first media gateway, a media route information request 310 to the second media gateway 110. The media route information request 310 includes the routing addresses of the allocated media processor resources of the first media gateway 104 and may further include any other Layer 3 and Layer 4 routing information associated with the first media gateway that may be useful in setting up the media session involving the first media gateway, and further requests routing addresses of media processor resources allocated to the media session at the second media gateway 110.

The second media gateway 110 receives, via a receiver 208 of the second media gateway, the media route information request 310 from the first media gateway 104. In response to receiving the media route information request 310, the second media gateway 110 sends, via a transmitter 206 at the second media gateway, a media route information response 312 to the first media gateway 104. The media route information response 312 includes the routing address of the second media processor resources allocated to the media session at the second media gateway 110 and may further include any other Layer 3 and Layer 4 routing information associated with the second media gateway that may be useful in setting up the media session involving the second media gateway. In response to receiving the media route information response 312, the first media gateway 104 initiates the media session between the first media gateway 104 and the second media gateway 110 for the transmission of data between the first media gateway 104 and the second media gateway 110. In an embodiment of the invention, the media session may be initialized by a session initializer 208 of the first media gateway 104.

In another embodiment of the present invention, the first media gateway 104 further may send a media path continuity check request 314 to the second media gateway 110. The media path continuity check request 314 comprises a data packet that is sent in-band and is used to verify a continuity of a bearer information media path between an application layer of the first media gateway 104 and an application layer of the second media gateway 110. The media path continuity check request 314 may be sent by a media path continuity verifier 212 of the first media gateway 104 via a transmitter module 216 of the media path continuity verifier. The second media gateway 110 receives the media path continuity check request 314 and, based on receipt of the media path continuity check request, verifies the continuity of the media path between the application layer of the first media gateway 104 and the application layer of the second media gateway 110, that is, determines that the bearer information media path from the application layer of the first media gateway to the application layer of the second media gateway appears to be operating normally, that is, at an acceptable error level. The different layers of the first media gateway 104 and the second media gateway 110 are explained in conjunction with FIG. 6. In one embodiment of the invention, the media path continuity check request 314 may be received by a receiver module 218 of a media path continuity verifier 212 of the second media gateway 110. Based on the received media path continuity check request 314, the media path continuity verifier 212 of the second media gateway 110 determines the continuity of the media path between the application layer of the first media gateway 104 and the application layer of the second media gateway 110.

In response to receiving the media path continuity check request 314 and determining the continuity of the media path continuity between the application layer of the first media gateway 104 and the application layer of the second media gateway 110, the second media gateway 110, and more particularly the media path continuity verifier 212 via a transmitter module 216 of the second media gateway, may send a media path continuity check response 316 to the first media gateway 104. The media path continuity check response 316 comprises a data packet that is sent in-band and is used to verify a continuity of a bearer information media path between the application layer of the second media gateway 110 and the application layer of the first media gateway 104. The media path continuity check response 316 may then be received by the media path continuity verifier 212 of the first media gateway 104 via a receiver module 216 of the media path continuity verifier. Based on receipt of the media path continuity check response 316, the first media gateway 104 may verify the bi-directional continuity of the bearer information media path between the application layer of the second media gateway 110 and the application layer of the first media gateway 104, that is, may verify that the bearer information media path between the application layer of the second media gateway and the application layer of the first media gateway is operating normally, that is, at an acceptable error level, in both directions.

If the media path continuity check response 316 indicates a failure in the media path continuity, then the first media gateway 104 terminates the media session between the first media gateway 104 and the second media gateway 110. The first media gateway 104 may then indicate this fault to the media gateway controller 102. In one embodiment of the invention, the media session may then be terminated by a session terminator 220 at the first media gateway 104. In another embodiment of the invention, the media session may instead, or in addition, be terminated by the media path continuity verifier 212 at the first media gateway 104.

In yet another embodiment of the invention, in response to sending media path continuity check request 314 to the second media gateway 110, the first media gateway 104 may initiate a timer 214 of the first media gateway. The timer 214 counts down a predetermined time during which the first media gateway 104 waits for receipt of the media path continuity check response 316 from the second media gateway 110. If the first media gateway 104 does not receive the media path continuity check response 316 from the second media gateway 110 prior to the expiration of the timer 214, that is, prior to the expiration of the predetermined time, the first media gateway 104, and in particular one or more of the session terminator 220 and the media path continuity verifier 212 at the first media gateway, terminates the media session between the first media gateway 104 and the second media gateway 110.

Figure 4:
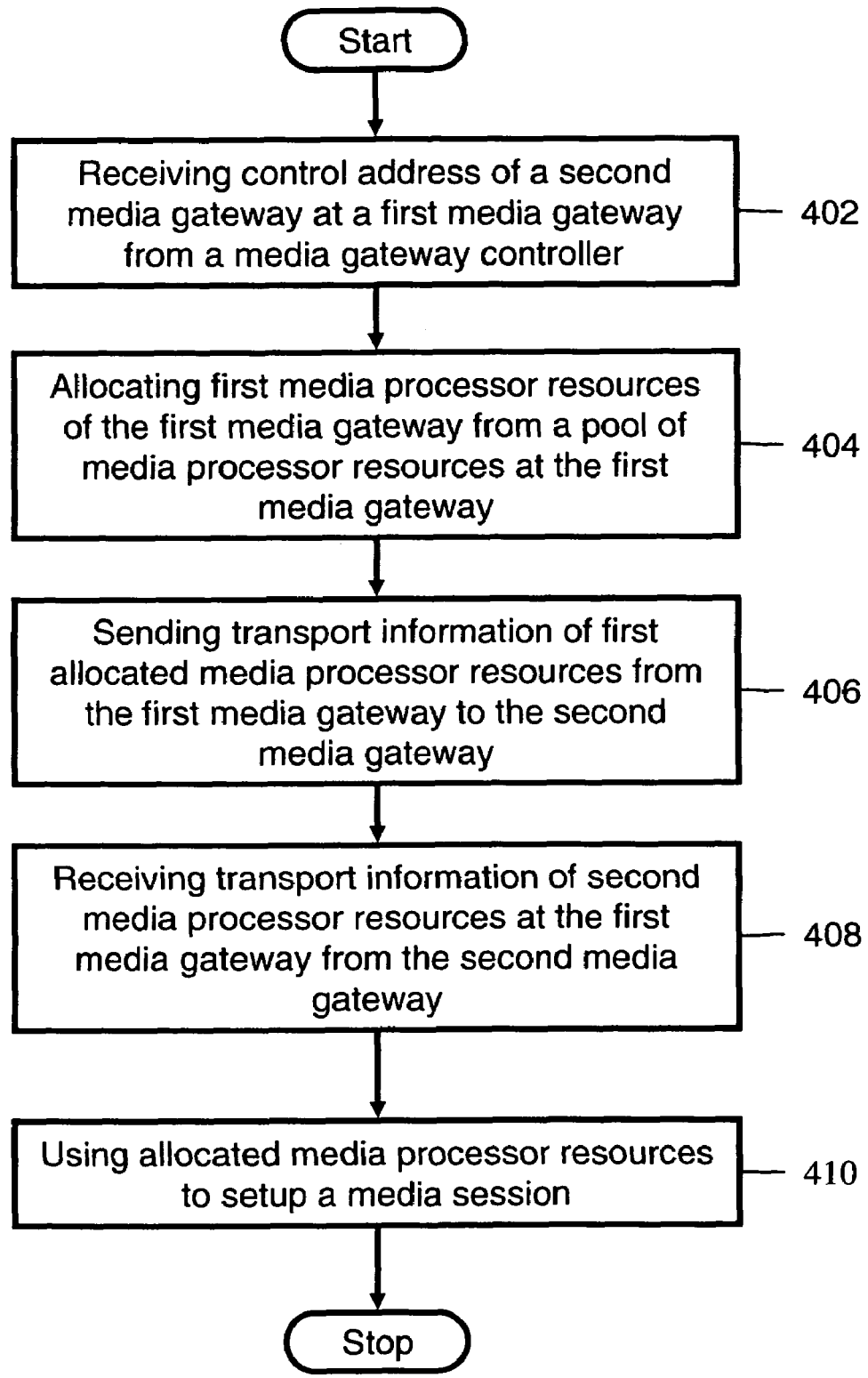
FIG. 4 is a logic flow diagram of a method executed by the first media gateway of FIG. 1 in setting up a media session in accordance with an embodiment of the present invention.

FIG. 4 is a logic flow diagram illustrating a method executed by the first media gateway 104 in setting up a media session between the first media gateway and the second media gateway 110 through the media gateway controller 102 in accordance with an embodiment of the present invention. At step 402, the first media gateway 104 receives a control address of the second media gateway 110 from the media gateway controller 102. At step 404, the first media gateway 104 allocates media processor resources of the first media gateway from a pool of media processor resources at the first media gateway. At step 406, after allocating the media processor resources at the first media gateway 104, the first media gateway sends to the second media gateway 110 transport information comprising routing addresses associated with the media processor resources allocated at the first media gateway 104 and/or any other Layer 3 and Layer 4 routing information associated with the first media gateway that may be useful in setting up the media session between the two gateways and that bypasses the media gateway controller 102. The first media gateway 104 further requests transport information associated with the second media gateway 110, such as routing addresses associated with media processor resources allocated at the second media gateway 110 and/or any other Layer 3 and Layer 4 routing information associated with the second media gateway that may be useful in setting up the media session. At step 408, the first media gateway 104 receives the requested transport information from the second media gateway 110. At step 410, after exchanging the transport information between the first media gateway 104 and the second media gateway 110, the first media gateway 104 initializes the media session.

Figure 5:
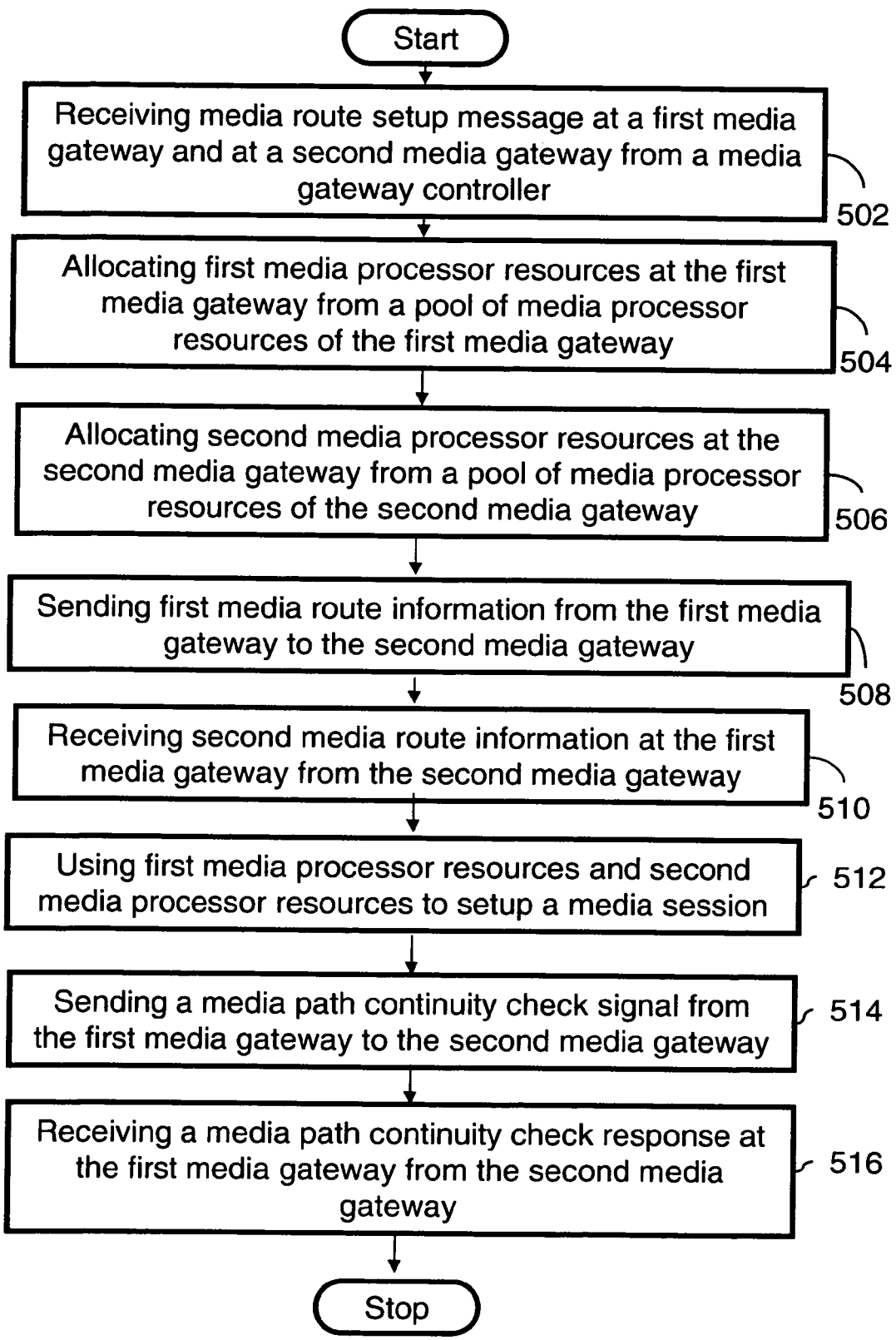
FIG. 5 is a logic flow diagram of a method executed by the communication system of FIG. 1 in setting up a media session in accordance with an embodiment of the present invention.

FIG. 5 is a logic flow diagram illustrating a method for setting up a media session between the first media gateway 104 and the second media gateway 110, through the media gateway controller 102, in accordance with an embodiment of the present invention. At step 502, the first media gateway 104 and the second media gateway 110 each receive a media route set up message from the media gateway controller 102. At step 504, the first media gateway 104 allocates media processor resources from the pool of media processor resources 204 at the first media gateway. At step 506, the second media gateway 110 allocates media processor resources from the pool of media processor resources 204 at the second media gateway.

After media processor resources have been allocated at each of the first media gateway 104 and the second media gateway 110, the first media gateway sends a first media route information to the second media gateway at step 508. The first media route information includes transport information associated with the media processor resources allocated at the first media gateway, such as routing addresses associated with the media processor resources allocated at the first media gateway 104 and/or any other Layer 3 and Layer 4 routing information associated with the first media gateway that may be useful in setting up the media session, and further requests transport information associated with the second media gateway 110. At step 510, the first media gateway 104 receives a second media route information from the second media gateway 110. The second media route information includes the requested transport information, such as routing addresses associated with the media processor resources allocated at the second media gateway 110 and/or any other Layer 3 and Layer 4 routing information associated with the second media gateway that may be useful in setting up the media session.

After exchanging the transport information between the first media gateway 104 and the second media gateway 110, the media session is initialized based on the exchanged transport information at step 512. At step 514, the first media gateway 104 sends an in-band media path continuity check signal to the second media gateway 110. The media path continuity check signal verifies a continuity of the media path between the application layers of the first and the second media gateways 104, 110. In response to sending the media path continuity check signal, the first media gateway 104 receives an in-band media path continuity check response from the second media gateway 110 at step 516. If a fault exists in the media path continuity, this is indicated via the exchange of the media path continuity check signal and the media path continuity check response. In such a case, the first media gateway 104 terminates the media session between the first and the second media gateways 104, 110.

In another embodiment of the invention, after sending the media path continuity check signal, the first media gateway 104 may wait a predetermined period of time for receipt of the media path continuity check response from the second media gateway 110. If the first media gateway 104 does not receive a media path continuity check response from the second media gateway 110 prior to an expiration of the predetermined period of time, the first media gateway may terminate the media session.

Figure 6:
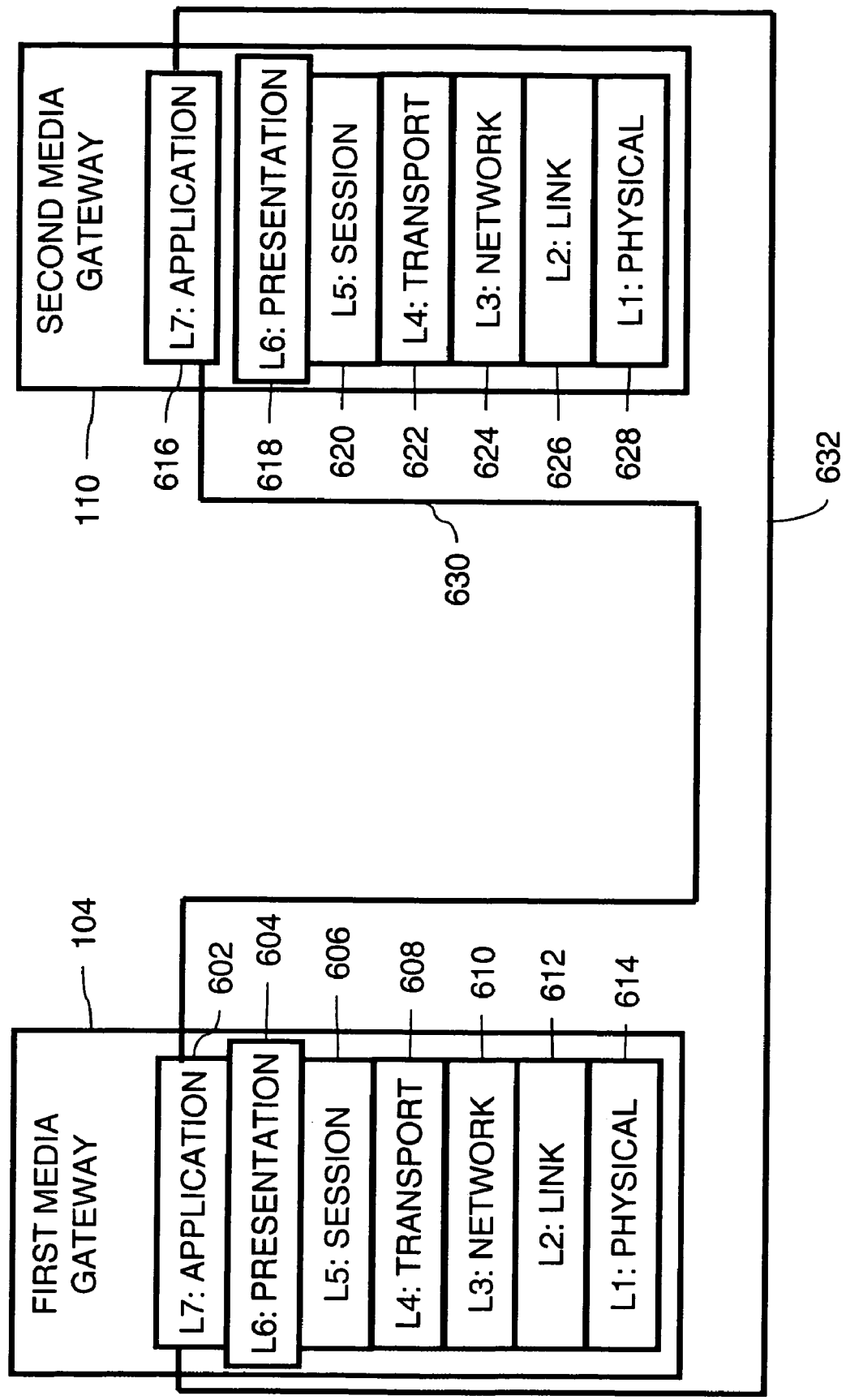
FIG. 6 is a block diagram of an architecture of the first media gateway of FIG. 1 and the second media gateway of FIG. 1 for a checking of the media path continuity in association with a media session in accordance with an embodiment of the present invention.

FIG. 6 is a block diagram of an architecture the first media gateway 104 and the second media gateway 110 for a checking of the media path continuity in association with a media session in accordance with an embodiment of the present invention. The media path continuity check is performed to check the media path continuity between the application layers of the first media gateway 104 and the second media gateway 110.

Typically, a media gateway may be divided into seven protocol layers. These seven protocol layers comprise, in a hierarchical order, an application layer, a presentation layer, a session layer, a transport layer, a network layer, a link layer and a physical layer. In one embodiment of the invention, the each of the first media gateway 104 and the second media gateway 110 is divided in a respective application layer 602, 616, a respective presentation layer 604, 618, a respective session layer 606, 620, a respective transport layer 608, 622, a respective network layer 610, 624, a respective link layer 612, 626, and a respective physical layer 614, 628. Each application layer 602, 616 supports the transfer of data between the applications at the first media gateway 104 and those at the second media gateway 110. Each presentation layer 604, 618 provides independence from differences in data representation in transmissions between the first media gateway 104 and the second media gateway 110 (for example, differences in encryption) by translating the data from an application to a network format, and vice versa. Further, the presentation layer transforms data into a form that the application layer can accept. Each session layer 606, 620 establishes, manages and terminates connections between applications. Each transport layer 608, 622 provides transfer of data between the first media gateway 104 and the second media gateway 110 that is transparent to the higher layers. The transport layer is also responsible for error recovery and flow control in transmissions between the first media gateway 104 to the second media gateway 110. Each network layer 610, 624 provides switching and routing and creates logical paths for transmissions between the first media gateway 104 and the second media gateway 110. At each link layer 612, 626, data packets are encoded and decoded into bits. This layer furnishes transmission protocol knowledge and management and handles errors in the physical layer, flow control and frame synchronization. Each physical layer 614, 628 provides the hardware means for a sending and a receiving of data between the first media gateway 104 and the second media gateway 110.

Communication system 100 provides for a check of the media path continuity between the application layers of the first media gateway 104 and the second media gateway 110, as a fault in the media path continuity may exist in any of the seven layers of either node. The first media gateway 104 sends a media path continuity check signal 632 to the second media gateway 110 for a checking of a media path continuity. The media path continuity check signal 632 is a data packet that sent in-band and is used to verify a continuity of a bearer information media path from the application layer 602 through the physical layer 614 at the first media gateway 104 and the physical layer 628 through the application layer 616 at the second media gateway 110. Based on a receipt of the media path continuity check signal 632, the second media gateway 110 determines a continuity of the media path between the application layer 602 at the first media gateway 104 and the application layer 616 at the second media gateway 110. That is, if a layer in a receiving gateway detects an error in the media path continuity check signal 632, then the layer may discard the data packet or may otherwise indicate an error to the higher layers. As a result, if the application layer 616 receives the media path continuity check signal 632 at an acceptable error level from the application layer 602, then the receipt of the signal is a verification of a continuity, that is, a normal operation or acceptable error level of operation, of the bearer path from the application layer 602 to the application layer 616.

After determining the continuity of the media path between the application layers 602 and 616 at the second media gateway 110, the second media gateway 110 sends a media path continuity check response 630 to the first media gateway 104. Similar to the media path continuity check signal 632, media path continuity check response 630 is a data packet that is sent in-band and is used to verify a continuity, that is, an operation at an acceptable, or normal, error level, of a bearer information media path from the application layer 616 through the physical layer 628 at the second media gateway 110 and the physical layer 614 through the application layer 602 at the first media gateway 104. Based on receipt of the media path continuity check response 630, the first media gateway 104 is able to determine a bi-directional continuity of the media path between the application layer 616 at the second media gateway 110 and the application layer 602 at the first media gateway 104. If the media path continuity check response 630 indicates a failure in the media path continuity, such as an unacceptable error level and/or a discarding of the data packet, the media session is terminated and a notification is sent to the media gateway controller 102.

Figure 7:
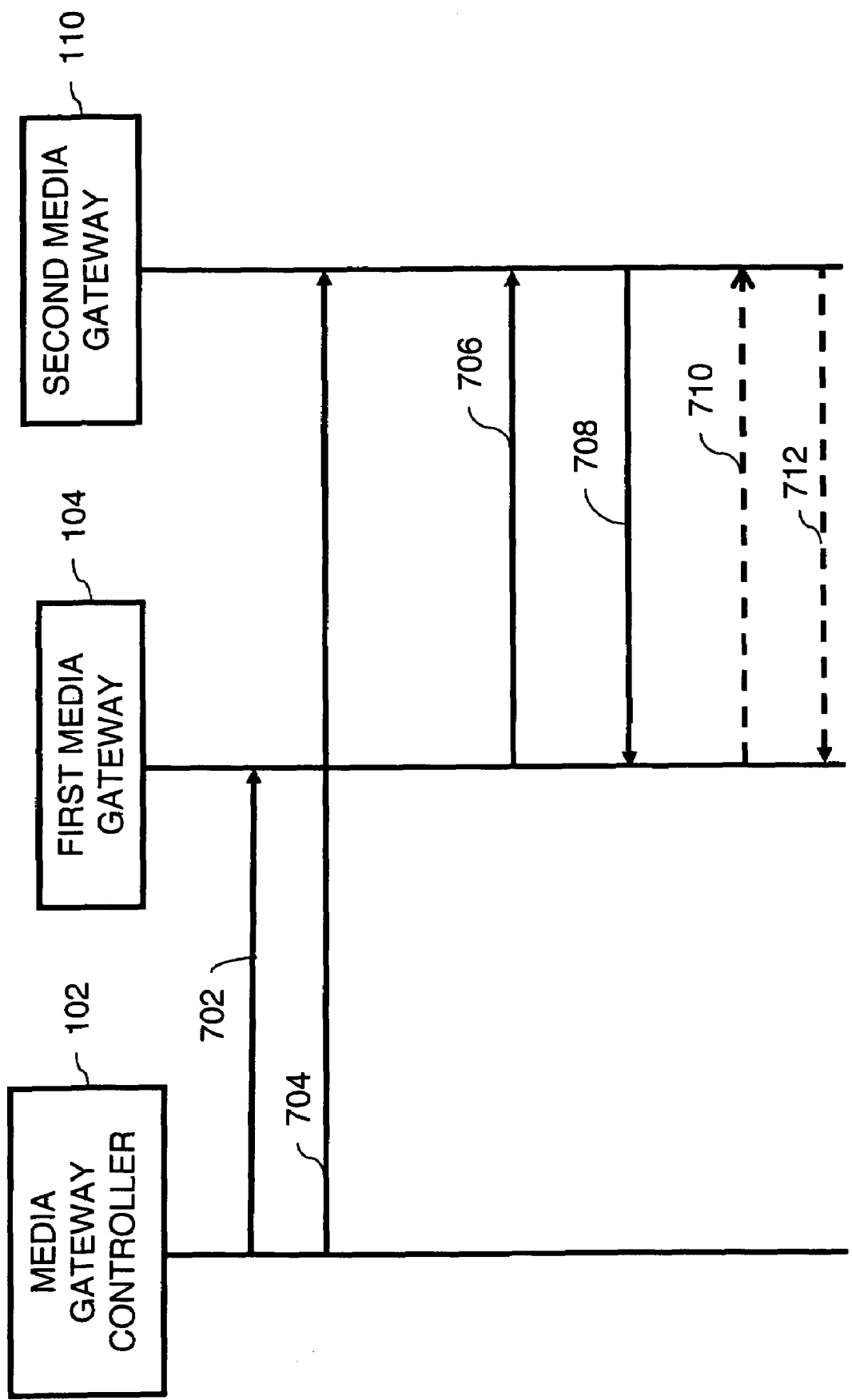
FIG. 7 is a signal flow diagram illustrating a setting up of a media session by the communication system of FIG. 1 in accordance with various embodiments of the present invention.

FIG. 7 is a signal flow diagram illustrating a setting up of a media session between the media gateway controller 102, the first media gateway 104, and the second media gateway 110 in accordance with various embodiments of the present invention. The media gateway controller 102 sends a first media route set up message 702 to the first media gateway 104. The first media route set up message 702 includes a control address of the second media gateway 110. The media gateway controller 102 sends a second media route set up message 704 to the second media gateway 110. The second media route set up message 704 includes a control address associated with the first media gateway 104. The first media gateway 104 allocates media processor resources from the pool of media processor resources 204 at the first data processing node 104. After allocating media processor resources for the media session, the first media gateway 104 sends a media route information request 706 to the second media gateway 110. The media route information request 706 includes a media session identification and port addresses of the allocated media processor resources of the first media gateway 104 and may further include any other Layer 3 and Layer 4 routing information associated with the first media gateway that may be useful in setting up the media session. The media route information request 706 further requests transport information associated with the second media gateway 110.

The second media gateway 110 allocates media processor resources from the pool of media processor resources 204 at the second media gateway 110. In response to receiving the media route information request 706, the second media gateway 110 sends a media route information response 708 to the first media gateway 104. The media route information response 708 includes session identification and port addresses of the allocated media processor resources of the second media gateway 110 and may further include any other Layer 3 and Layer 4 routing information associated with the second media gateway that may be useful in setting up the media session. After the first media gateway 104 receives the media route information response 708 from the second media gateway 110, the media session is set up between the first media gateway 104 and the second media gateway 110. The first media gateway 104 further may send an in-band media path continuity check request 710 to the second media gateway 110 for verifying a continuity of the bearer information media path between the application layer of the first media gateway 104 and the application layer of the second media gateway 110. Based on receipt of the media path continuity check request 710 at the second media gateway 110, the second media gateway 110 may determine a continuity of the media path between the first media gateway 104 and the second media gateway 110. After determining the media path continuity, the second media gateway 110 may then send an in-band media route continuity check response 712 to the first media gateway 104 and indicate, to the first media gateway 104, if there is a failure in the media path continuity.

Figure 8:
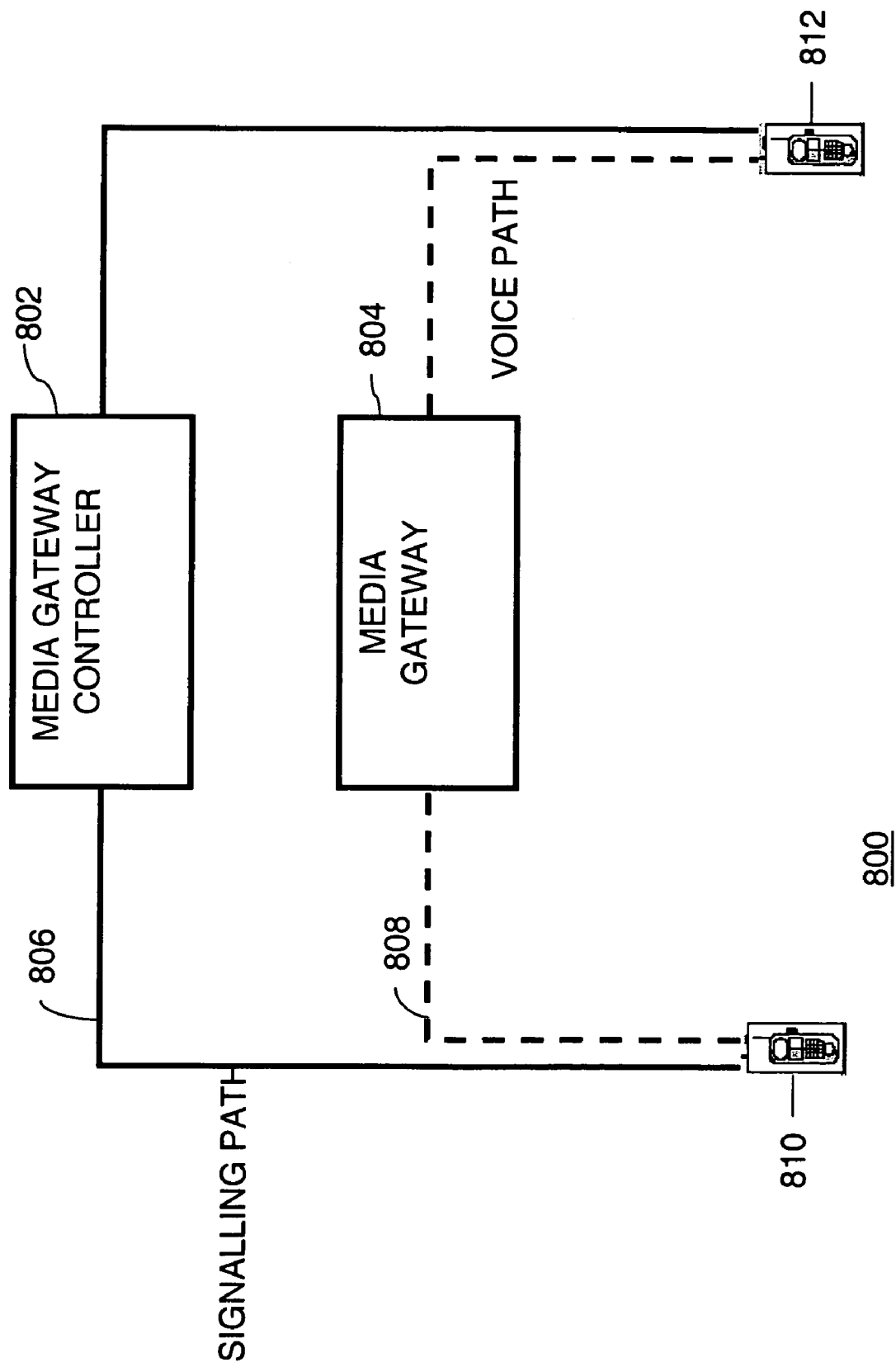
FIG. 8 is a block diagram illustrating an edge routing method for implementing a Push-to-anything (PTx) and/or a Push-to-Talk over Cellular (PoC) communication session in a communication network in accordance with another embodiment of the present invention.

FIG. 8 is a block diagram depicting an edge routing method for implementing a Push-to-anything (PTx) and/or a Push-to-talk on Cellular (PoC) communication session in a communication network 800 in accordance with another embodiment of the present invention. Communication network 800 includes a media gateway controller 802 a media gateway 804, a transmitting mobile device 810, and a receiving mobile device 812. The transmitting mobile device 810 transmits information to the receiving mobile device 812 through a push-to-talk facility in the communication network 800. The transmitting mobile device 810 sends a request 806 for transmitting information to the media gateway controller 802. The media gateway controller 802 receives and forwards the request 806 for approval to the receiving mobile device 812. In response to the receiving mobile device 812 acknowledging the request 806 for information and accepting the request 806, the transmitting mobile device 810 transmits the data to the receiving mobile device 812 via the media gateway 804. This data does not pass through the media gateway controller 802.

Figure 9:
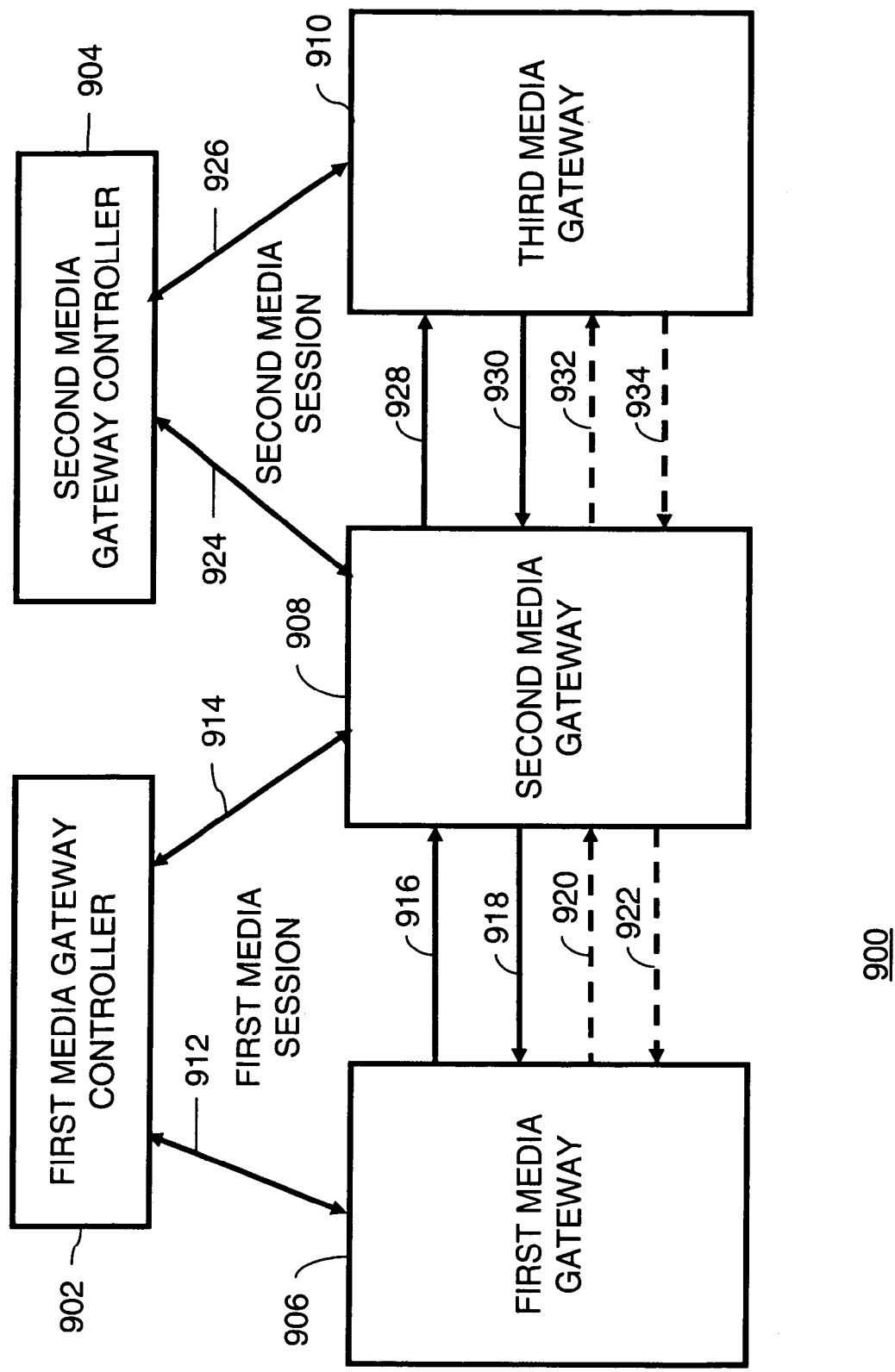
FIG. 9 is a block diagram illustrating signal flows associated with a setting up of two concurrent media sessions in a communication network in accordance with another embodiment of the present invention.

FIG. 9 is a signal flow diagram depicting a setting up of two concurrent media sessions in a communication network 900 in accordance with another embodiment of the present invention. Communication network 900 includes a first media gateway controller 902 that is coupled to each of a first media gateway 906 and a second media gateway 908. Communication network 900 further includes a second media gateway controller 904 that is coupled to each of the second media gateway 908 and a third media gateway 910. A first media session is to be set up between the first media gateway 906 and the second media gateway 908 and a second media session is to be set up between the second media gateway 908 and the third media gateway 910, which communication sessions overlap in time.

For the first media session, the first media gateway 906 receives a first media route set up message 912 from the first media gateway controller 902. The first media route set up message 912 provides the first media gateway 906 with routing information that is used to set up the first media session with the media processor resources of the first media gateway 906 and media processor resources of the second media gateway 908. The second media gateway 908 receives a second media route set up message 914 from the first media gateway controller 902. The second media route set up message 914 informs the second media gateway 908 of the first media session between the first media gateway 906 and the second media gateway 908. The second media route set up message 914 further provides the second media gateway 908 with routing information that is used to set up the media session with the first media gateway 906.

Similarly, for the second media session, the second media gateway 908 receives a third media route set up message 924 from the second media gateway controller 904. The third media route set up message 924 provides the second media gateway 908 with routing information that is used to set up the second media session with the media processor resources of the second media gateway 908 and media processor resources of the third media gateway 910. The third media gateway 910 receives a fourth media route set up message 926 from the second media gateway controller 904. The fourth media route set up message 926 informs the third media gateway 910 of the a media session between the second media gateway 908 and the third media gateway 910. The fourth media route set up message 926 further provides the third media gateway 910 with routing information that is used to set up the media session between the second media gateway 908 and the third media gateway 910.

In response to receiving the first media route set up message 912, the first media gateway 906 allocates the media processor resources from a pool of media processor resources 204 at the first media gateway 906 for a communication session with second media gateway 908. In response to receiving the second media route set up message 914, the second media gateway 908 allocates media processor resources from a pool of media processor resources 204 at the second media gateway 908 for a communication session with first media gateway 906. The first media gateway 906 sends a media route information request 916 to the second media gateway 908. The media route information request 916 includes routing addresses of the allocated media processor resources of the first media gateway 906 and/or other pertinent Layer 3 and Layer 4 information of the first media gateway and further requests routing addresses of media processor resources allocated to the media session at the second media gateway 908. In response to receiving the media route information request 916, the second media gateway 908 sends a media route information response 918 to the first media gateway 906 that includes the routing address of the allocated media processor resources of the second media gateway 908 and/or other pertinent Layer 3 and Layer 4 information of the second media gateway.

In response to receiving third media route set up message 924, the second media gateway 908 allocates media processor resources from the pool of media processor resources 204 at the second media gateway 908 for a communication session with third media gateway 910. And in response to receiving fourth media route set up message 926, the third media gateway 910 allocates media processor resources from a pool of media processor resources 204 at the third media gateway 910 for a communication session with second media gateway 908. The second media gateway 908 sends a media route information request 928 to the third media gateway 910. The media route information request 928 includes routing addresses of the media processor resources of the second media gateway 908 allocated to the media session with third media gateway 910 and/or other pertinent Layer 3 and Layer 4 information of the second media gateway 908 and further requests routing addresses of media processor resources allocated to the media session at the third media gateway 910. In response to receiving the media route information request 928, the third media gateway 910 sends a media route information response 930 to the second media gateway 908 that includes the routing addresses of the allocated media processor resources of the third media gateway 910 and/or other pertinent Layer 3 and Layer 4 information of the third media gateway.

After the first media gateway 906 receives the media route information response 918, the first media gateway 906 initiates a first media session with the second media gateway 908 for transmission of data. The second media gateway 908 has the routing addresses of the allocated media processor resources of the third media gateway 910, and initiates the second media session between the second media gateway 908 and the third media gateway 910 for the transmission of data. In the first media session, the first media gateway 906 further may send an in-band media path continuity check request 920 to the second media gateway 908 for verifying the media path continuity between the first media gateway 906 and the second media gateway 908. The second media gateway 908 receives the media path continuity check request 920 and, based on the received media path continuity check request, determines a continuity of the bearer information media path between an application layer of the first media gateway 906 and an application layer of the second media gateway 908. In response to determining the media path continuity, the second media gateway 908 then may send an in-band media path continuity check response 922 to the first media gateway 906. If the media path continuity check response 922 indicates a failure in the media path continuity, the first media gateway 906 terminates the media session between the first media gateway 906 and the second media gateway 908.

Similarly, the second media gateway 908 may send an in-band media path continuity check request 932 to the third media gateway 910 to verify the media path continuity between the second media gateway 908 and the third media gateway 910. The third media gateway 910 receives the media path continuity check request 932 and, based on the received media path continuity check request, determines a continuity of the bearer information media path between the application layer of the second media gateway 908 and the application layer of the third media gateway 910. In response to determining the media path continuity, the third media gateway 910 then may send an in-band media path continuity check response 934 to the second media gateway 908. If the media path continuity check response 934 indicates a failure in the media path continuity, the second media gateway 908 terminates the media session between the second media gateway 908 and the third media gateway 910. Although the establishment of the two media sessions is described simultaneously, it should be appreciated that a similar procedure may be carried out to establish a second media session between the second media gateway 908 and the third media gateway 910 while the second data transmission 908 is already participating in the first media session.

In a similar manner and as described above, a media gateway may simultaneously be a part of multiple media sessions with other media gateways. Further, a media gateway can act as the first media gateway 104 in one media session, while acting as the second media gateway 110 in another media session.

The various embodiments of the method and system for setting up a media session in a communication network described herein offer a number of advantages. Various embodiments of the present invention allow a first media gateway to initiate the media session between the first media gateway and a second media gateway. A media gateway controller is not required to allocate media processor resources at the first media gateway and the second media gateway, thereby saving a significant amount of operator networking bandwidth that is utilized to set up a media session. In an embodiment of the invention, the media session is set up and media path continuity between the application layer of the first media gateway and the application layer of the second media gateway is verified. The first media gateway is informed of a fault and the location of a fault, if a fault exists, in the media path continuity, thus eliminating 'dead-air' transmission or failed media delivery. Moreover, failures in software application in the media path continuity are also detected.

It will be appreciated that the method and system for setting up a media session in a communication systems 100, 800, and 900 described herein may comprise one or more conventional processors and unique stored program instructions that control the one or more processors to implement, in conjunction with certain non-processor circuits, some, most, or all of the functions of the method for setting up the media session in a communication system described herein. The non-processor circuits may include, but are not limited to, a radio receiver, a radio transmitter, signal drivers, clock circuits, power source circuits, and user input devices. As such, these functions may be interpreted as steps of a method to set up a media session in a communication network. Alternatively, some or all functions could be implemented by a state machine that has no stored program instructions, or in one or more application specific integrated circuits ASICs, in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for setting up a media session in a communication network, the communication network comprising a plurality of media gateways and a media gateway controller, each of the plurality of media gateways comprising a pool of media processor resources, the method comprising:
    receiving a control address of a second media gateway at a first media gateway, wherein the control address is received from the media gateway controller;
    allocating first media processor resources at the first media gateway from a pool of media processor resources at the first media gateway;
    sending transport information associated with the first media processor resources to the second media gateway;
    receiving transport information of second media processor resources of the second media gateway;
    using the first media processor resources and the second media processor resources for setting up the media session between the first media gateway and the second media gateway; and
    determining that an in-band media path between an application layer of the first media gateway and an application layer of the second media gateway appears to be operating normally.

2. The method in accordance with claim 1 further comprising receiving a request for initiating the media session between the first media gateway and the second media gateway, wherein the request is received from the media gateway controller.

3. The method in accordance with claim 1 further comprising allocating the second media processor resources from a pool of media processor resources at the second media gateway.

4. The method in accordance with claim 1 wherein determining that an in-band media path between an application layer of the first media gateway and an application layer of the second media gateway appears to be operating normally comprises sending a media path continuity check signal.

5. The method in accordance with claim 4 wherein determining that an in-band media path between an application layer of the first media gateway and an application layer of the second media gateway appears to be operating normally further comprises receiving a media path continuity check in response to sending the media path continuity check signal.

6. The method in accordance with claim 5 further comprising terminating the setting up of the media session when the media path continuity check response indicates a fault in the media path continuity.

7. The method in accordance with claim 4 further comprising:
    in response to sending the media path continuity check signal, waiting a time period for receipt of a media path continuity check; and
    terminating the setting up of the media session at the expiration of the time period.

8. A method for setting up a media session in a communication network, the communication network comprising a plurality of media gateways and a media gateway controller, each of the plurality of media gateways comprising a pool of media processor resources, the method comprising:
    receiving a media route set up message from the media gateway controller at a first media gateway of the plurality of media gateways and at a second media gateway of the plurality of media gateways;
    allocating first media processor resources by the first media gateway from the pool of media processor resources at the first media gateway;
    allocating second media processor resources by the second media gateway from the pool of media processor resources at the second media gateway;
    sending a first media route information comprising transport information associated with the first media processor resources from the first media gateway to the second media gateway;
    receiving a second media route information comprising transport information associated with the second media processor resources from the second media gateway at the first media gateway; and
    using the first media processor resources and the second media processor resources for setting up the media session between the first media gateway and the second media gateway; and sending an in-band media path continuity check signal from the first media gateway to the second media gateway;

receiving the media path continuity check signal at the second media gateway; and determining that a media path between an application layer of the first media gateway and an application layer of the second media gateway appears to be operating normally based on the media path continuity check signal.

9. The method in accordance with claim 8, wherein sending the first media route information comprises sending transport information associated with the allocated media processor resources of the first media gateway to the second media gateway.

10. The method in accordance with claim 9 further comprising:

in response to receiving the media path continuity check signal, sending a media path continuity check response from the second media gateway to the first media gateway; and receiving a media path continuity check response at the first media gateway from the second media gateway.

11. The method in accordance with claim 8 further comprising terminating the setting up of the media session when the media path continuity check response indicates a fault in the media path continuity.

12. The method in accordance with claim 8, further comprising:

sending a media path continuity check signal from the first media gateway to the second media gateway;

in response to sending the media path continuity check signal, waiting a time period to receive a media path continuity check response at the first media gateway from the second media gateway; and terminating the setting up of the media session at the expiration of the time period.

13. A system for setting up a media session in a communication network, the system comprising:

a plurality of media gateways, wherein each media gateway of the plurality of the media gateways is configured to allocate media processor resources from a pool of media processor resources at the media gateway and wherein each media gateway of the plurality of media gateways comprises a media path continuity verifier that is configured to verify that a media path between an application layer of the media gateway and an application layer of another media gateway is operating normally; and a media gateway controller that is configured to send and receive control addresses of one or more media gateways that are intended participants in the media session of the plurality of media gateways.

14. The system according to claim 13, wherein each media gateway of the plurality of media gateways comprises:

a media processor resource allocator that is configured to allocate media processor resources from the pool of media processor resources at the media gateway;

a transmitter that is configured to send a first media route information from the media gateway to another media gateway of the plurality of media gateways;

a receiver that is configured to receive a second media route information from the another media gateway of the plurality of media gateways; and a session initializer that is configured to initialize the media session between the media gateway and the another media gateway.

15. The system according to claim 14, wherein the first media route information comprises transport information associated with media processor resources of the media gateway and the second media route information comprises transport information associated with media processor resources of the another media gateway.

16. The system according to claim 13 wherein the media path continuity verifier of a media gateway of the plurality of media gateways comprises:

a transmitter module that is configured to send a media path continuity check signal from the first media gateway; and a receiver module that is configured to receive a media path continuity check response at the first media gateway.

17. The system according to claim 13 wherein the media path continuity verifier of a media gateway of the plurality of media gateways comprises:

a receiver module that is configured to receive a media path continuity check signal at the media gateway; and a transmitter module that is configured to send a media path continuity check response from the media gateway.

18. The system according to claim 13, wherein each media gateway of the plurality of media gateways comprises a session terminator that is configured to terminate the media session when the media path continuity verifier reports a fault in media path continuity.

19. The system according to claim 13 wherein the media path continuity verifier of each media gateway of the plurality of media gateways further comprises a timer that counts down a time period and wherein each media gateway of the plurality of media gateways further comprises a session terminator that is configured to terminate a setting up of the media session at the expiration of the time period.

* * * * *